United States Patent [19]
Beasley

[11] Patent Number: 5,918,154
[45] Date of Patent: Jun. 29, 1999

[54] COMMUNICATIONS SYSTEMS EMPLOYING ANTENNA DIVERSITY

[75] Inventor: Andrew S. Beasley, Lake Errock, Canada

[73] Assignee: PCS Wireless, Inc., Vancouver, Canada

[21] Appl. No.: 08/701,725

[22] Filed: Aug. 22, 1996

Related U.S. Application Data

[60] Provisional application No. 60/002,705, Aug. 23, 1995.

[51] Int. Cl.$^6$ ........................................... H04Q 7/32
[52] U.S. Cl. ......................... 455/11.1; 455/550; 455/562
[58] Field of Search ..................... 455/11.1, 422, 455/524, 561, 273, 276.1, 101, 103, 560, 137, 550, 562, 15, 14, 5.1, 503; 348/10–12; 370/315, 335, 342, 279; 379/56.1, 56.3

[56] References Cited

U.S. PATENT DOCUMENTS

| | | | |
|---|---|---|---|
| 4,659,878 | 4/1987 | Dinkins ................................. | 455/11.1 |
| 4,864,641 | 9/1989 | Nakamura ............................ | 455/276.1 |
| 5,280,472 | 1/1994 | Gilhousen et al. ..................... | 370/18 |
| 5,289,499 | 2/1994 | Weerackody .......................... | 375/1 |
| 5,321,850 | 6/1994 | Backstrom et al. ................... | 455/276.1 |
| 5,347,535 | 9/1994 | Karasawa et al. .................... | 455/276.1 |
| 5,353,307 | 10/1994 | Lester et al. ........................ | 455/403 |
| 5,377,255 | 7/1992 | Beasley ............................... | 370/279 |
| 5,394,435 | 2/1995 | Weerackody ........................ | 375/206 |
| 5,437,055 | 7/1995 | Wheatley, III ...................... | 455/33.3 |
| 5,448,602 | 9/1995 | Ohmori et al. ...................... | 375/347 |
| 5,513,176 | 4/1996 | Dean et al. ......................... | 370/18 |
| 5,648,968 | 7/1997 | Reudink ............................. | 370/352 |
| 5,724,662 | 3/1998 | Goldberg et al. .................... | 455/503 |

FOREIGN PATENT DOCUMENTS 2059370   7/1992   Canada.

OTHER PUBLICATIONS

Proakis, John G., Dept. of electrical and computer Engineering, Northeastern University, Digital Communications, pp. 776–807.

Proakis, John G., Digital Communications, pp. 797–806 published by McGraw–Hill, Inc.

Andrew J. Viterbi and Roberto Padovani, Implications of Mobile Cellular CDMA, IEEE Communications Magazine, Dec. 1992, pp. 38–41.

*Primary Examiner*—Dwayne D. Bost
*Assistant Examiner*—Jean A. Gelin
*Attorney, Agent, or Firm*—Nikaido, Marmelstein, Murray & Oram LLP

[57] ABSTRACT

An CDMA telephone system, an RF repeater is connected through a CATV plant and a RASP to a base station and exchanges radio signals with a mobile handset. The base station includes a RAKE receiver and the RF repeater employs a pair of receive signal paths and a pair of transmit signal paths, each with a delay line in one, to provide transmit and receive antenna diversity without doubling the band with the CATV plant.

12 Claims, 4 Drawing Sheets

COMMUNICATIONS SYSTEMS EMPLOYING ANTENNA DIVERSITY

This application claims benefit of United States Provisional Application No. 60/002,705 filed Aug. 23, 1995.

BACKGROUND OF THE INVENTION

1. Field of the Invention

The present invention relates to communications systems and is useful in particular for mobile telephone systems which exchange code division multiple accessor (CDMA) transmit and receive signals between a mobile handset and a base station through a signal conduit, (e.g. a co-axial cable or an optical fiber cable in a cable television (CATV) plant), or via dedicated co-axial cable of a MEX distributed antenna array.

2. Description of the Related Art

It is known to provide telephone communication to a mobile telephone handset by collecting one or more RF repeaters in the form of commercially available remote antenna drivers (RADs) through a CATV plant to a remote antenna signal processor (RASP) and a base station. The base station interfaces with a public switched telephone network and provides modulated transmit signals, e.g. in the form of code division multiple access (CDMA) transmit signals, through a series combination of RASP-CATV plant-RADs for transmission as radio signals to the mobile handset. From the mobile handset, signals are transmitted as radio signals to the RADs, from which they are passed through the CATV plant to the RASP, and then to the base station for demodulation and connection to the public switched telephone network.

The base station supplies the transmit signals at a first predetermined frequency to the RASP, at which the transmit signals are frequency converted to a second or intermediate frequency, filtered and again frequency converted to a third frequency, which is suitable for transmission through the CATV plant to the RADs. At the RADs, the transmit signals are frequency converted to an intermediate frequency, filtered and then frequency converted back to the first frequency, at which they are transmitted as radio signals to the mobile handset. Signals from the mobile handset are similarly processed through the RADs-CATV plant-RASP combination so as to be transported back to the base station.

Another feature characteristic of the RAD-RASP technology is the use of simulcast techniques to create large coverage areas from the summation of smaller coverage zones. That is to say that a RASP can support more than one RAD simultaneously, and that those simultaneously supported RADs use the same frequencies for transmission of signals over the CATV plant, (both RASP-to-RAD and RAD-to-RASP transmissions), and as radio signals (i.e. RAD to mobile handset and mobile handset to RAD).

This simulcast technique allows many RADs to operate without demanding excessive bandwidth from the CATV plant.

By siting RADs at some distance from one another mobile handsets over a wide area can be supported with implications on the ability to roam within that wide area i.e. the RADs may be located at a multiplicity of remote sites.

The wireless line is typically enhanced by using two (or more) antennas in the locale of the remote site to receive the mobile transmissions. This practice is referred to as antenna 'diversity, and is effective in improving the wireless link quality in certain radio propagation environments (e.g., multipath environments).

Thus, antenna diversity at an individual RAD can be used to offset the effect of path fading that would occur using a single receive antenna. More particularly, the use at the RAD of a second antenna spaced at an optimum distance from the first will provide a second or diversity channel that can be presented to the base station so that the base station can use the best of the two channels, if required. This diversity option has the effect of extending the reliable coverage area. To give a concrete example:

A RAD is the equipment used at the remote site. A RAD would typically be installed 18–25 feet above the ground on the steel wire between two telephone poles. The radio link is a 1.9 GHz CDMA system.

The RAD might have three antennas: one transmit and two receive antennas. These three antennas would typically be spaced apart with three to six feet between each antenna being the norm. Obviously, in practice., the nature of a RAD site can constrain the maximum separation that can be achieved in any event.

The purpose of the additional receiving antenna is to improve the link quality in the presence of multipath: i.e., if one receiving antenna is in a multipath null, it is unlikely the second antenna is simultaneously in a multipath null since the three to six feet separation represents many wavelengths at the operating frequency. (Note there is very little benefit having greater than 10 wavelengths of separation. At 1.9 Ghz, 10 wavelengths is a 5 feet separation.)

The RAD can support many mobile handsets simultaneously. In addition, the demodulation resource is contained within the base station at the central site. These two facts make it difficult for the RAD to determine which receiving antenna is the "best". Indeed, if two mobile handsets are operating, they may give optimal performance each using different antennas. As a consequence, the RAD must be constructed to present both sets of receive signals for the base station to demodulate.

Thus, use of antenna diversity at the RAD results in the use of twice the CATV plant bandwidth between the RAD and the centralized base station (the "upstream" or "receive" signal path), i.e. to allow the benefits of antenna diversity the base station needs independent access to the receive signal waveforms at both receiving antennas at the RAD.

The doubling of return path CATV bandwidth is a distinct disadvantage in the use of RAD-RASP equipment, since the CATV plant typically has a restricted amount of return path bandwidth available. In addition, increased cost and complexity are inevitable once an independent return path is added.

Other concrete examples could be given for RADs using different numbers of antennas, or of using antenna diversity in the improvement of signal quality at the mobile handset (i.e. antenna diversity for RAD transmissions), with similar conclusions that increased CATV plant bandwidth is required.

In describing the related art it is important to note the commercially available MEX (microcell extender) technology. This technology allows the same functions to be performed as the RAD-RASP, but utilizes dedicated coax between remote sites (at which MEX devices, not RADs, are located). Consequently the advantages and disadvantages of antenna diversity are the same for both RAD and MEX technologies. The term "RF repeater" is therefore used herein to include both RADs and MEXs.

Certain CDMA wireless technologies employ a RAKE receiver in the base station, and/or in the mobile handset.

A RAKE receiver allows the received signal to be distinguished not just by virtue of its operating frequency, its time of operation and its code, but also by the net delay incurred between the transmitter and the receiver. More precisely, the RAKE can distinguish between signals of the same code and nominally the same signal strength, but of different delay, provided the delay is equal to or larger than a chip period.

IEEE Communications Magazine, Dec. 1992 ("Implications of Mobile Cellular CDMA by A. J. Viterbi et al.), (see FIG. 8 in particular) exemplifies the ability of the RAKE to distinguish the mobile handset signals via a path delay.

BRIEF SUMMARY OF THE INVENTION

By imposing a time delay at one of the two receiving antennas at a remote site (e.g., within the RAD), and then summing the signals from the two receiving antennas prior to being transported over the signal conduit (e.g. placed on a CATV return path), it becomes possible to use antenna diversity at the remote site without doubling the return path bandwidth requirements. A RAKE receiver is provided at a base station for processing the summed signals.

The addition of the delay element in the RAD or MEX need not affect the advantages associated with the above-described base station signal-conduit- RF repeater technologies, which continue to support a multiplicity of remote sites and mobile handsets in a simulcast environment over a large region, as before.

The time delay may be imposed at RF or at IF within the RAD or MEX. Note that in the proposed invention the base station has a prior knowledge of the extra delay in one path, so the base station can avoid being "confused" by the asymmetry in delay between the two receiving paths.

For the important case of cellular CDMA, a time delay of the order of 2.5 to 7.5 microseconds would typically be used.

According to the present invention, a communications systems comprises a signal conduit connecting a base station to a wireless communications receiver, the wireless communications receiver including a pair of antennas, a pair of respective signal paths leading from said antennas, means for imposing a signal delay in one of the signal paths, means for summing the signals in the signal paths and an outlet for the summed signals, the outlet being connected through the signal conduit to the remote base station and the base station comprising a RAKE receiver connected to receive the summed signals.

According to a preferred embodiment of the present invention, a digital telephone system employs an RF repeater connected through a signal conduit for exchanging radio signals with a mobile handset and the RF repeater has a pair of antennas for receiving radio signals broadcast by the mobile handset, a pair of respective signal paths connected to the antennas, with a delay element in one of the paths, and a connection between the paths for summing the signal on the path, the summed signals then being supplied through the signal conduit to the base station. A RAKE receiver is provided at this base station for processing the summed signals.

BRIEF DESCRIPTION OF THE DRAWINGS

Further objects features and advantages of the present invention will become more readily apparent to those skilled in the art from the following description thereof when taken in conjunction with the accompanying drawings, in which.

DESCRIPTION OF THE PREFERRED EMBODIMENTS

Figure 1:
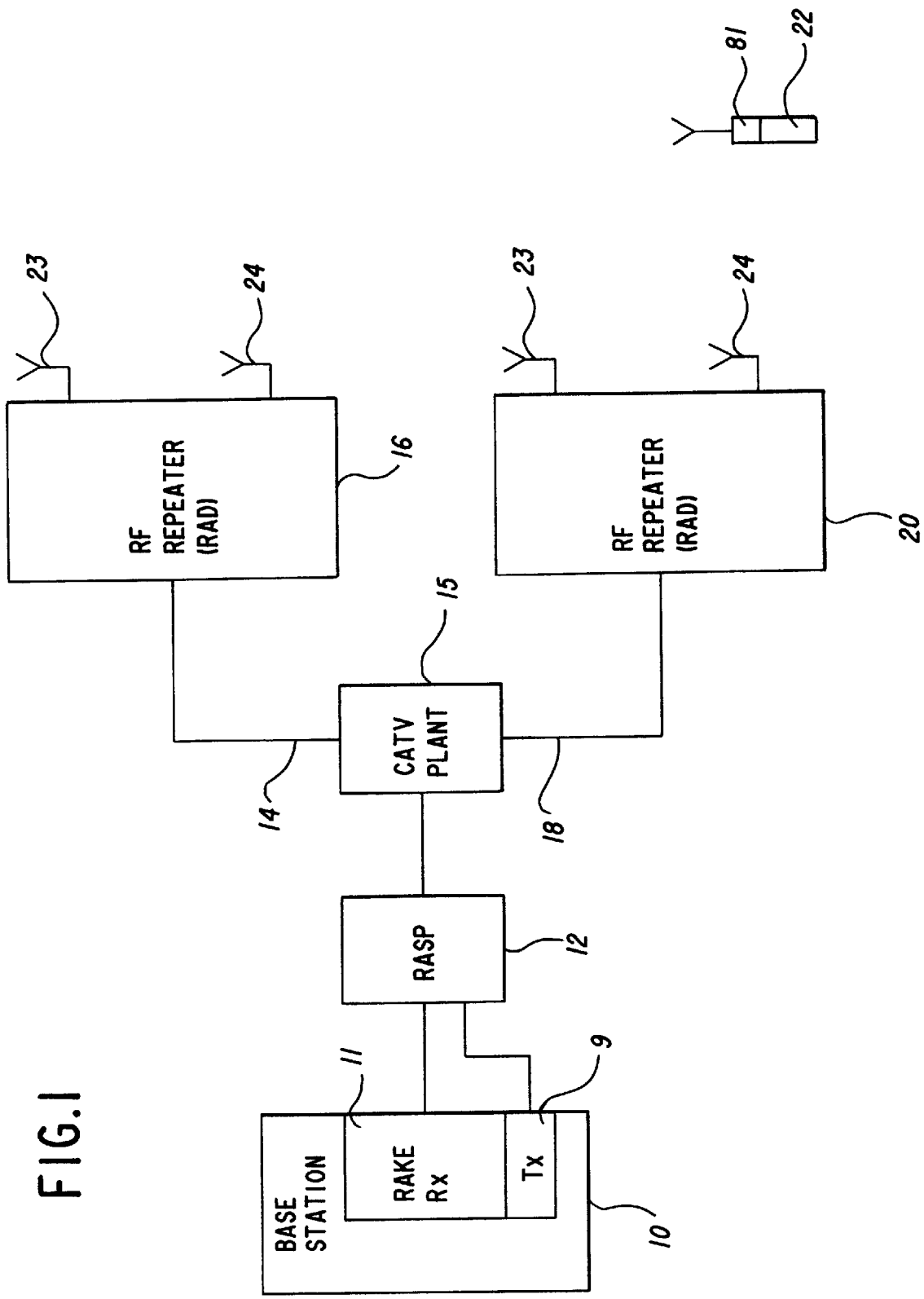
FIG. 1 shows an RF repeater arrangement in which two RF repeaters according to the present, each employing a pair of antennas for diversity, are connected through a RASP to a base station.

Referring firstly to FIG. 1, there is shown a base station 10 for connection to a public switched telephone network (not shown). The base station 10 includes a transmitter 9 and a RAKE receiver 11 the purpose of which is described below. Such receivers are well known in the art and are described, for example, in DIGITAL COMMUNICATIONS, Third Edition, pp. 797–806, by John G. Proakis, published by McGraw-Hill, Inc. The base station 10 is connected through a RASP 12 and a coaxial cable 14 forming part of a CATV plant to an RE repeater in the form of a RAD 16. The cable 14 is connected through a further co-axial cable 18 to another RF repeater in the form of a second RAD 20. The RADs 16 and 20 each have a pair of transmit and receive antennas 23 and 24.

Figure 2:
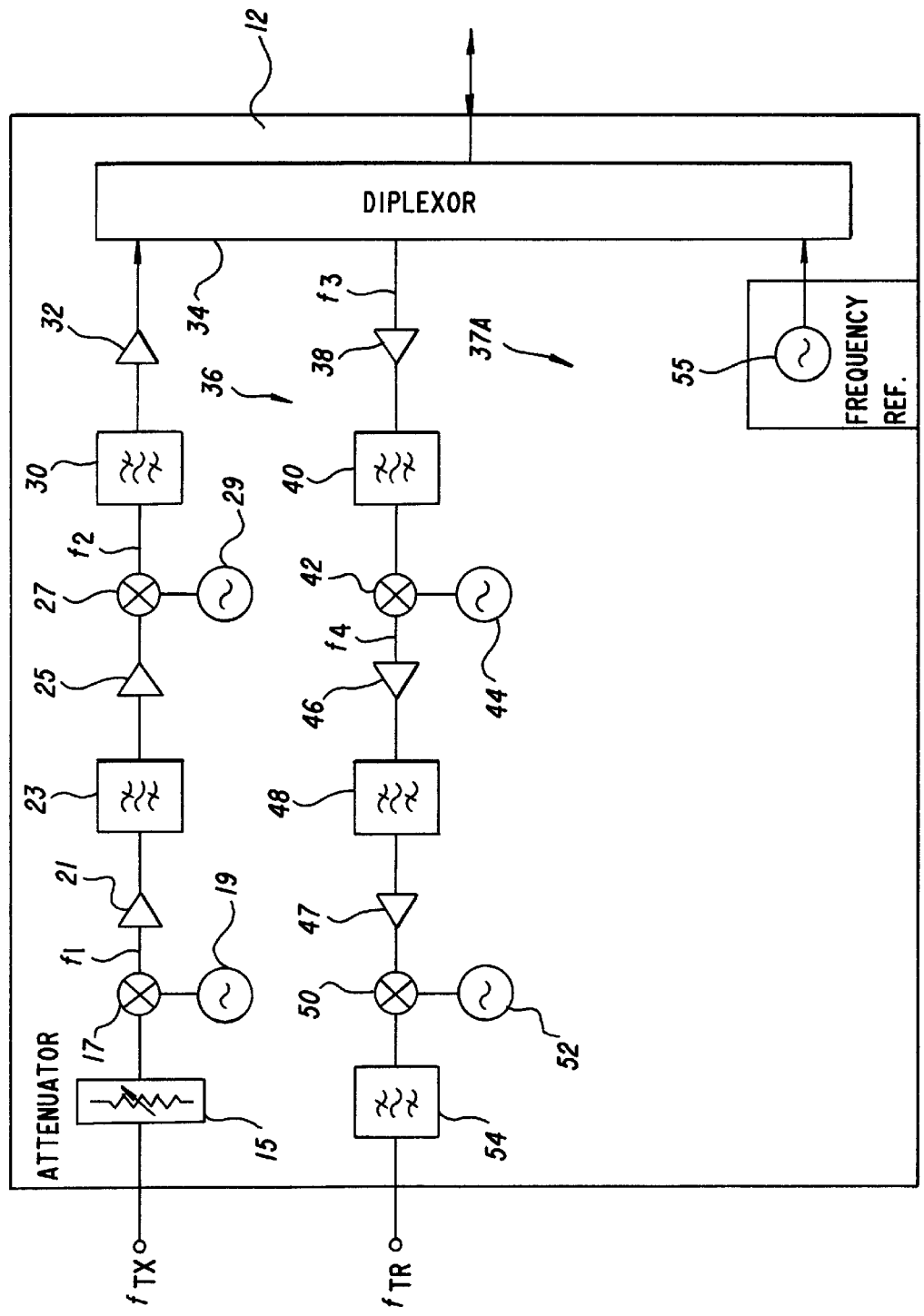
FIG. 2 shows a circuit diagram of the RASP of FIGS. 1 and 2.

The RASP 12 receives transmit signals broadcast from the transmitter 9 at the base station 10 at a first frequency $^f$tx, and, as shown in FIG. 2. includes an attenuator 15 for attenuating the signals and a mixer 17 and an oscillator 19, which frequency-convert these transmit signals to an intermediate frequency $^f1$. The mixer 17 is followed by an amplifier 21, a bandpass filter 23 and a further amplifier 25 for amplifying and filtering the transmit signals, which are then frequency-converted by a further mixer 27 and an oscillator 29 to a frequency $^f2$. Te frequency $^f2$ is selected to be suitable for transmission over the CATV plant. The transmit signals are then further filtered by a bandpass filter 30 and amplified by an amplifier 32 before passing through a diplexer 34 to the downstream CATV plant 15, including the cables 14 and 18, and to the RADs 16 and 20. At the RADs 16 and 20 the transmit signals are heterodyned to $^FTX$ and then broadcast as radio signals to mobile handset 22.

In the upstream or receive signal path, the radio signals transmitted at frequency $^FTR$ by the mobile handset 22 are received and suitably heterodyned by the RAD and supplied at a frequency $^f3$ through the CATV plant 15. including the cables 14 and 18, to the diplexer 34 of the RASP 12.

In order to support diversity, a RASIP normally has two upstream or return paths. However in the present apparatus, the RASP 12 has one upstream or return signal path, indicated generally by reference numeral 36 for processing the receive signals from the RF repeaters 16 and 20.

The signal path 36 has an amplifier 38 and a bandpass filter 40 for amplifying and filtering the receive signal, followed by a mixer 42 with an oscillator 44 for frequency-converting the signal supplied by the CATV plant to an intermediate frequency $^f3$.

The mixer 42 is followed by a pair of amplifiers 46 and 47 and a further bandpass filter 48 for amplifying and filtering the intermediate frequency receive signal, which is then frequency-converted by a further mixer 50 and an oscillator 52 to a frequency $^FAR$.

Following further filtering by filter 54, the receive signal is supplied from the RASP 12 to the base station 10.

An oscillator 55 provides a reference frequency to the diplexer 34, for transmission over the CATV plant to the RADs 16 and 20. This reference frequency is used to phase lock all heterodyne operations in the RASP 12 and the RADs 16 and 20.

Figure 3:
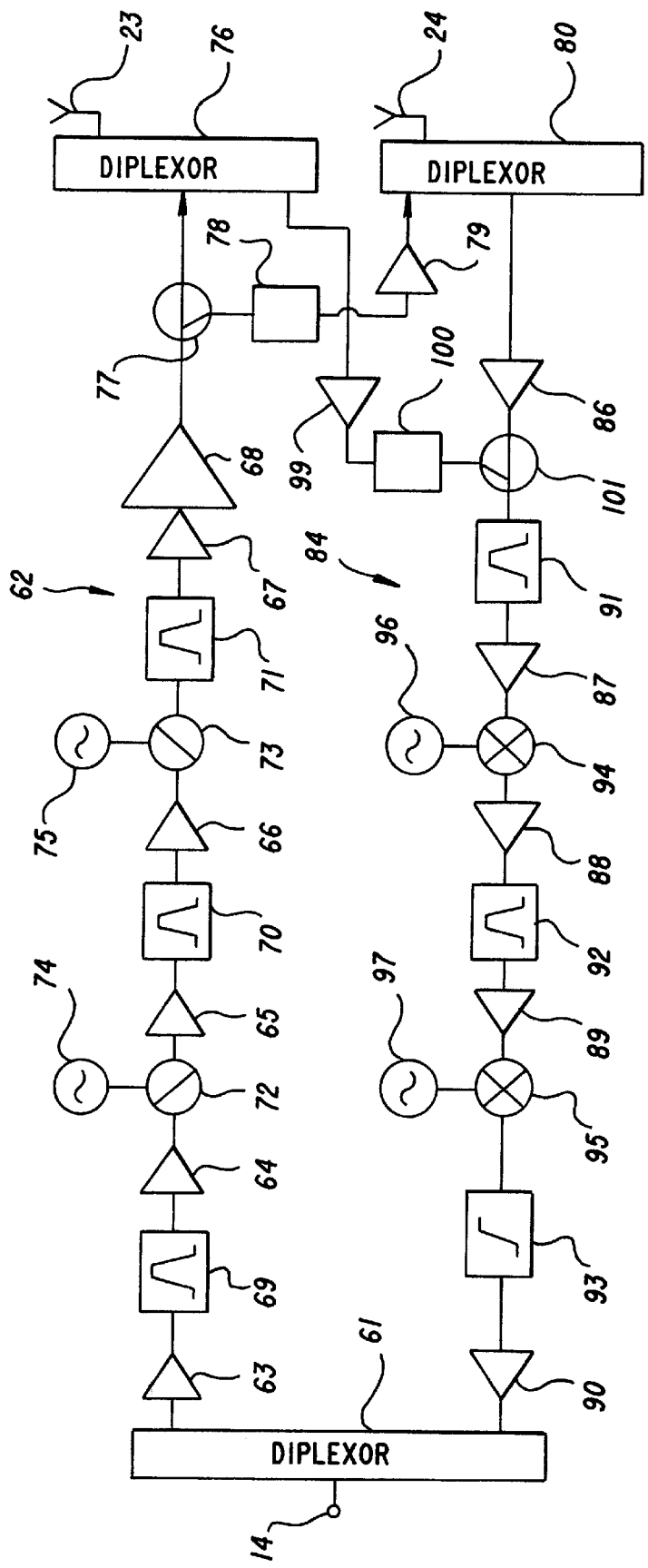
FIG. 3 shows a block diagram of one of the RF repeaters of FIG. 2.

FIG. 3 shows in greater detail the RAD 16 of FIG. 1. Since the RAD 20 is similar in construction and operation to the RAD 16, the RAD 20 is not illustrated and described in detail herein and, accordingly, it is to be understood that the following description of the RAD 16 also applies to the RAD 20.

The RAD 16 has a diplexer 61 connected between the cable 14 and a transmit signal path 62, which includes RF amplifiers 63 through 68, bandpass filters 69 through 71 and mixers 72 and 73, with oscillators in the form of phase locked loop synthesizers 74 and 75 connected to the mixers 72 and 73, for supplying modulated transmit signals through a diplexer 76 to the antenna 23 in a manner which will be familiar to those skilled in the art.

The signal output from the amplifier 68 is split by a splitter 77 into two paths: one path connects to the diplexer 76 and the other to a delay element 78. Typically, the delay element 78 is lossy, so another amplifier, indicated by reference numeral 79, is required to re-establish the correct signal level prior to the second diplexer 80, which connects the signal to the antenna 24.

The transmit signal is thus broadcast as a first radio signal by the antenna 23 and as a second radio signal, which is delayed relative to the first radio signal, by the antenna 24.

The mobile handset 22 includes a RAKE receiver 81 (FIG. 1) for processing these two radio transmit signals and utilizes both signals in the detection and hence avoids deep fades when the handset 22 is located in a null of only one of the two signals.

The magnitude of the time delay imposed by the delay element 78 is typically an integral multiple of the chip rate. Thus, for example, if the chip rate is 1 Mbit per second, the time delay is typically 1, 2 or 3 microseconds.

Also, the RAD 16 of FIG. 3 has a receive signal path, indicated generally by reference numeral 84, which extends between the diplexer 80, and the diplexer 61 and which has amplifiers 86 through 90, bandpass filters 91 and 92, a low pass filter 93 and mixers 94 and 95, with oscillators 96 and 97 connected to the mixers 94 and 95. Thus, in a manner which will likewise be apparent to those skilled in the art, the receive signal channel 84 serves to amplify, filter and frequency convert the receive signal received by the antenna 23 from the mobile handset 22.

The receive signal received by the antenna 24 is passed through the diplexer 80 and an amplifier 99, and is then passed through a delay element 100, after which it is summed with the signal from the antenna 23 by a coupler 101.

Thus, a first receive signal from the antenna 23 and a second receive signal, on which a delay relative to the first receive signal is imposed by the delay line 100, are summed on the receive signal path 84 following the first stage amplifiers 86 and 99.

In the present embodiment, delay lines 48 and 100 are implemented as SAW delay lines, but other types of delay elements may be employed.

When it is not possible to introduce a delay at RF because of the high frequency, a delay can be imposed at the intermediate frequency.

Figure 4:
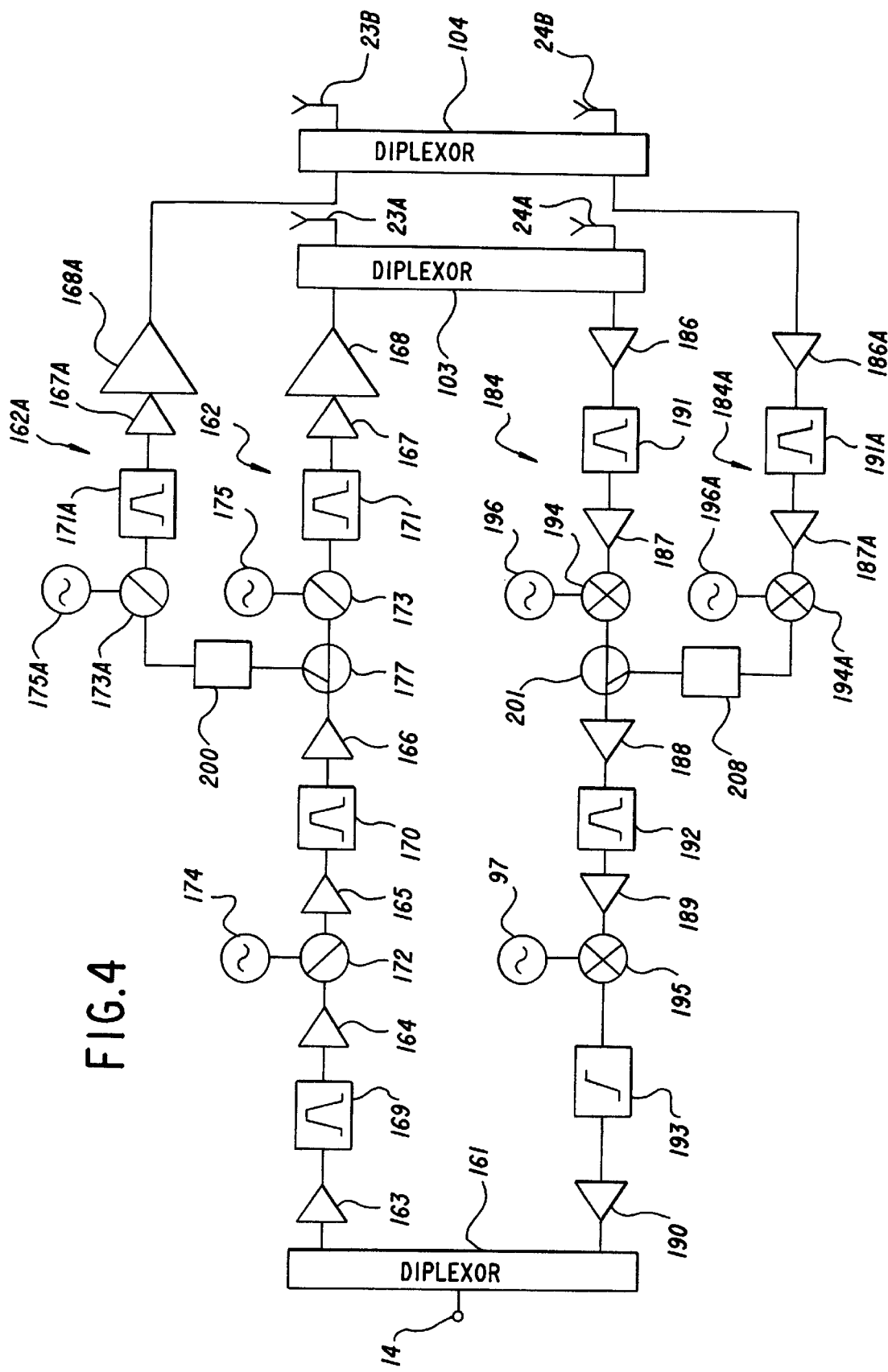
FIG. 4 shows a block diagram of a modified RFX repeater according to the present invention.

FIG. 4 shows a modification, according to the present invention, of the RAD 16.

In FIG. 4, components which are the same as those in FIG. 3 are, for convenience, indicated by the same reference numerals, increased by 100, as those employed in FIG. 3.

The first transmit signal path 162 is connected from the output of the amplifier 168 to the first antenna 23A via diplexer 103.

An auxiliary transmit signal path, indicated generally by reference numeral 162A, extends from the transmit signal path 162 to a second transmit antenna 23B via a diplexer 104. The auxiliary transmit signal path 162A comprises a delay line 200, connected between amplifier 166 and mixer 173 by a splitter 177, followed by a mixer 173A, provided with an oscillator 175A, a bandpass filter 171A and amplifiers 167A and 168A.

In operation, the transmit signal broadcast from the antenna 23B is delayed by the delay line 200 relative to that broadcast by the antenna 23A, thus facilitating reception by the mobile handset RAKE 81 of the stronger of these two transmit signals.

The receive signal path 184 is, in this case, connected to a first receive antenna 24A via the diplexer 103 and an auxiliary receive signal path indicated generally by reference numeral 184A is connected, via the diplexer 104, and via a coupler 201, between a second receive antenna 24B and the receive signal path 184.

The auxiliary receive signal path 184A comprises an amplifier 186A, a bandpass filter 191A, an amplifier 187A, a mixer 194A provided with an oscillator 196A and a delay line 203, which is connected between the mixer 194 and the bandpass filter 188.

By means of the delay line 203, a receive signal from the antenna 24B is delayed relative to that from the antenna 24A before both are summed on the receive signal path 184. The summed receive signals are passed through the CATV plant and the RASP 12 to the base station 10, where they are processed by the RAKE receiver 11.

As will be apparent to those skilled in the art, various further modifications may be made in the above-described apparatus within the scope of the appended claims.

What is claimed is:

1. A communications system comprising a base station, a wireless communications receiver and a signal conduit connecting said base station to said wireless communications receiver, said wireless communications receiver including a pair of antennas; a pair of respective signal paths leading from said antennas; means for imposing a signal delay in one of said signal paths, means for summing the signals in said signal paths and an outlet for the summed signals, said outlet being connected through said signal conduit to said base station and said base station comprising a RAKE receiver connected to receive the summed signals.

2. A communications system as claimed in claim 1, wherein said wireless communications receiver is one of a plurality of similar receivers in different locales, said receivers being connected through said signal conduit to said base station.

3. A communications system comprising a base station, a wireless communications transmitter and a signal conduit connecting said transmitter and said base station, said transmitter wireless communications transmitter including a pair of antennas a pair of respective signal paths leading to said antennas, means for splitting a transmit signal from said base station into two said signal paths and means for imposing a signal delay in one of said signal paths, said system further including a mobile handset and said handset including a RAKE receiver responsive to transmissions of said transmit signal from said antennas.

4. A communications system as claimed in claim 3, wherein said transmitter is one of a plurality of transmitters provided in different locales and connected through said signal conduit to said base station.

5. A wireless telephone system, comprising a mobile handset, a base station, an RF repeater and a signal conduit connecting said RF repeater to said base station, said RF repeater comprising a pair of antennas; a pair of respective receive signal paths leading from said antennas for conducting wireless telephone signals received by said antennas from said mobile handset; a delay element in one of said receive signal paths; a connection between said receive signal paths for summing the receive signals on one of said receive signal paths, and a receive signal outlet for the summed receive signals connected to said one of said receive signal paths and to said signal conduit, said base station including a RAKE receiver connected to said signal conduit.

6. An wireless telephone system as claimed in claim 5, wherein said RF repeater includes a transmit signal input, a transmit signal path connected between said transmit signal input and a first one of said antennas; and a delay line connected between said transmit signal path and the other of said antennas, whereby a transmit signal supplied to said transmit signal input is broadcast as a first radio signal from said first one of said antennas and as a second radio signal, which is delayed relative to said first radio signal, from the other of said antennas, said handset including a RAKE receiver responsive to said first and second radio signals.

7. A wireless telephone system as claimed in claim 5, wherein said RF repeater includes a further pair of antennas, a transmit signal input, a transmit signal path connected between said transmit signal input and a first one of said further pair of antennas; and a delay line connected between said transmit signal path and the other one of said further pair of antennas, whereby a transmit signal supplied to said transmit signal input is broadcast as a first radio signal from said first one of said antennas and as a second radio signal, which is delayed relative to said first radio signal, from said other one of said antennas, said mobile handset including a RAKE receiver responsive to the first and second radio signals.

8. A digital telephone system, comprising:
   a mobile wireless handset;
   a base station connected to a public switched telephone network;
   a RASP (remote antenna signal processor) connected to said base station;
   at least one RF repeater; and
   a signal conduit connected to said RF repeater and to said RASP;
   said RF repeater having a pair of antennas for receiving radio signals broadcast by said mobile handset, said antennas having a pair of respective signal paths, one of said signal paths including means for delaying the signal received by the respective one of said antennas, and the signal paths being connected so as to sum the delayed signal and the signal on the other of said signal paths; and
   an outlet connecting the summed signals to said signal conduit;
   said base station including a RAKE receiver connected to receive the summed signals from said signal conduit.

9. A digital telephone system as claimed in claim 8, wherein said RF repeater further comprises a transmit signal input, a transmit signal path connected between said transmit signal input and a first one of said antennas, and a delay line between said transmit signal path and the other one of said antennas, whereby a transmit signal supplied to said transmit signal input is broadcast as a first radio signal from said first one of said antennas and also as a second radio signal, which is delayed relative to said first radio signal, from the other one of said antennas; and said mobile handset includes a RAKE receiver for receiving the first and second radio signals.

10. A digital telephone system as claimed in claim 8, wherein said RF repeater comprises a further pair of antennas, a transmit signal input, a transmit signal path connected between said transmit signal input and a first one of said further pair of antennas, and a delay line between said transmit signal path and the other one of said further pair of antennas, whereby a transmit signal supplied to said transmit signal input is broadcast as a first radio signal from said first one of said antennas and as a second radio signal, which is delayed relative to said first radio signal, from the other one of said antennas; and said mobile handset includes a RAKE receiver for receiving the first and second radio signals.

11. A method of processing digital signals from a pair of antennas, which comprises the steps of imposing a delay on the signal received by one of the antennas to provide a delayed signal, summing the delayed signal with the signal received by the other of the antennas, transmitting the summed signals through a signal conduit to a location remote from the antennas and employing a RAKF, receiver at said location to process the summed signals.

12. A digital telephone system, comprising:
   a base station;
   a RASP connected to said base station;
   one or more RF repeaters remote from said base station and said RASP;
   a signal conduit connecting said RASP (remote antenna signal processor) and said RF repeater and a mobile handset for exchanging radio telephone signals with said RF repeater.
   said RF repeater including:
      a pair of antennas;
      a transmit signal input;
      a transmit signal path connected between said transmit signal input and a first one of said antennas; and
      a delay line between said transmit signal path and the other one of said antennas, whereby a transmit signal supplied to said transmit signal input is broadcast as a first radio signal from said first one of said antennas and as a second radio signal, which is delayed relative to said first radio signal, from said other one of said antennas;
   said mobile handset including a RAKE receiver for receiving the first and second radio signals.

* * * * *

UNITED STATES PATENT AND TRADEMARK OFFICE
CERTIFICATE OF CORRECTION

PATENT NO. : 5,918,154
DATED : June 29, 1999
INVENTOR(S) : Andrew Beasley

It is certified that error appears in the above-identified patent and that said Letters Patent is hereby corrected as shown below:

Abstract, line 8, delete "band with" and insert --bandwidth--

Abstract, line 8, after "bandwidth", insert--of--

Column 1, line 58, after "another", insert --,--

Column 1, line 65, delete "'" before "diversity"

Column 2, line 17, delete "." after "practice"

Column 4, line 25, delete "$^f$tx" and insert --$^F$TX--

Column 4, line 33, delete "Te" and insert --The--

Column 4, line 44, delete "." and insert --,--

Column 4, line 46, delete "RASIP" and insert --RASP--

Signed and Sealed this

Twenty-first Day of November, 2000

Attest:

Q. TODD DICKINSON

*Attesting Officer*   *Director of Patents and Trademarks*